Jan. 8, 1929.

F. M. HIBBEN 1,698,095

HEATING UNIT

Filed June 23, 1927

Frederick M. Hibben
Inventor
By Smith and Freeman
Attorneys

Patented Jan. 8, 1929.

1,698,095

UNITED STATES PATENT OFFICE.

FREDERICK M. HIBBEN, OF LAKEWOOD, OHIO.

HEATING UNIT.

Application filed June 23, 1927. Serial No. 200,870.

This invention relates to heating units, and particularly to electrically heated portable cooking utensils and air heaters designed for attachment to ordinary household electrical outlets, and the principal object of my invention is to provide a new and improved heating unit readily convertible to serve satisfactorily and efficiently a plurality of uses. In the drawings accompanying this specification and forming a part of this application I have shown, for purposes of illustration, and in part diagrammatically, one form which my invention may assume, and in these drawings:

Figure 1 is a plan view of the embodiment of my invention herein shown, while

Figure 1:
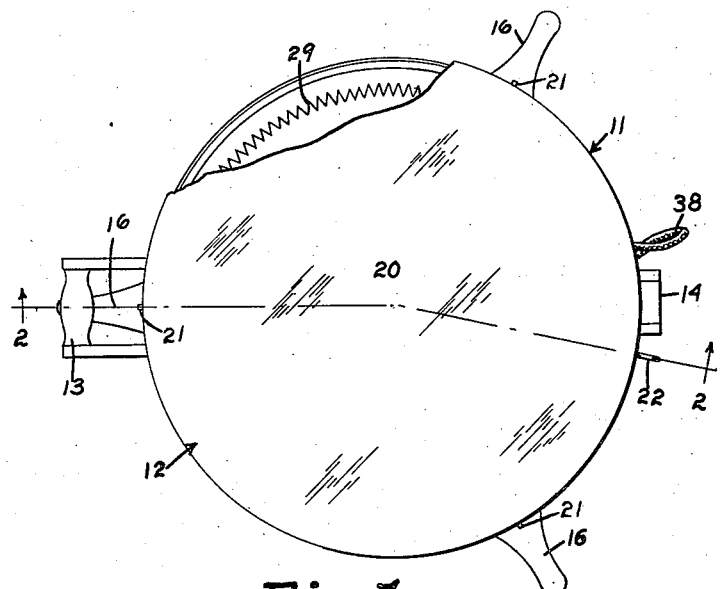
Figure 2:
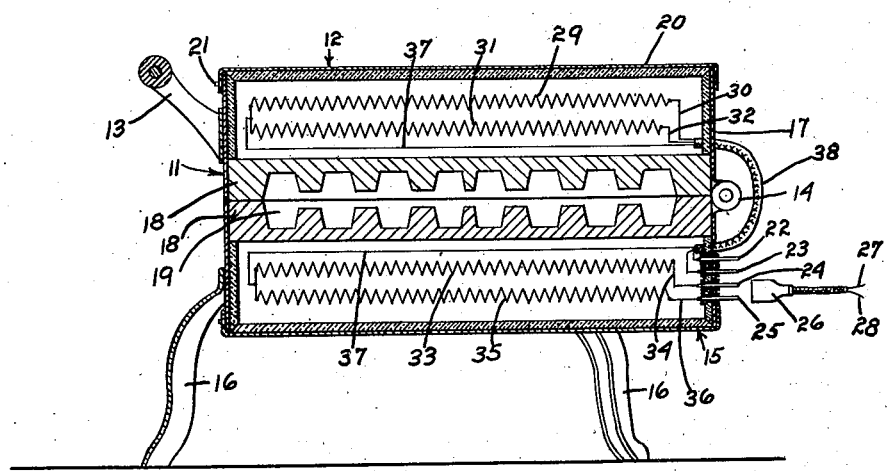
Figure 2 is a section on the line 2—2 of Figure 1.

It is well known to those skilled in the art that no device demanding in excess of 660 watts will be approved by the National Board of Fire Underwriters for use in the ordinary household electrical outlet, and accordingly that no device to be connected to the ordinary household electrical outlet can enjoy any appreciable sale in the United States unless its power consumption does not exceed this maximum of 660 watts. It is also well known to those skilled in the art that 660 watts provides substantially the proper heating for a waffle baker of the usual seven inch diameter, and that this size has become accepted as the standard in electrically heated domestic waffle bakers, and that waffle bakers of this size are in wide use throughout the United States. A number of devices have been proposed for adapting a waffle baker for other purposes, by conversion, but so far as I am aware in all these devices heretofore proposed the alternative use has been by a conversion of the waffle baker employing only half of the heat capacity of the waffle baker, and therefore furnishing heat too low for substantially all of the other uses proposed, certainly too low for cooking, or for broiling. The particular embodiment of my invention herein shown overcomes this defect and furnishes a single electrical heating unit satisfactory both as a waffle baker, as a cooking stove, and as a broiler.

The heating unit 11 herein shown comprises an upper section 12 provided with an operating handle 13 and pivotally connected by means of a hinge 14 to a similar lower section 15 supported in any suitable manner, as by a plurality of legs 16. Each of the sections 12 and 15 comprises a heat insulated annular frame member 17 closed at its end abutting the other section 15 or 12 by means of a cast metallic face plate 18 forming with the face plate 18 of the other section 15 or 12 a cavity 19 suitable for baking waffles, and closed at its other end by a wall portion variable between heat insulating condition confining and reflectitng the heat to the corresponding face plate 18 and heat transmitting condition permitting the passage of heat through that wall portion, the variation of that wall portion being accomplished in any desired manner, herein by forming that wall portion as a heat insulated closure plate 20 removably secured to the frame member 17 by means of suitable bayonet joints 21 normally holding the closure plate 20 in position closing the section 12 or 15 and confining and reflecting the heat to the corresponding face plate 18, but permitting removal of the closure plate 20 to permit emergence of the heat through the then open end of that frame member 17.

Mounted on the frame member 17 of the lower section 15 are four terminals 22 and 23 and 24 and 25 positioned in vertical alignment equally spaced so that any two adjacent terminals may be engaged by the two recesses of a two contact attachment plug 26 having its two contacts connected to power conductors 27 and 28, mounted in the upper section 12 is a first heating element 29 having one end connected by means of a conductor 30 to the upper terminal 22, mounted in the upper section 12 below the heating element 29 adjacent that face plate 18 is a second heating element 31 having one end connected by means of a conductor 32 to the second terminal 23, mounted in the lower section 15 adjacent the face plate 18 of the lower section 15 is a third heating element 33 having one end connected by means of a conductor 34 to the third terminal 24, mounted in the lower section 15 below the third element 33 is a fourth heating element 35 having one end connected by means of a conductor 36 to the fourth terminal 25, while connecting the free ends of the heating elements 29 and 31 and 33 and 35 is an intermediate common conductor 37.

It will of course be understood by those skilled in the art that between the two sections 12 and 15 the various conductors are carried in a suitable flexible cable 38.

From the above description it will be obvious to those skilled in the art that with the plug 26 applied to the first and second terminals 22 and 23 the first and second heating elements 29 and 31 will be energized, the full permitted heating capacity will be present in the top section, and the unit by removal of the top closure plate 20 will function as a cooking stove of full permitted heating capacity; that with the plug 26 applied to the second and third terminals 23 and 24 the second and third heating elements 31 and 33 will be energized, the entire permitted heating capacity will be divided between the upper and lower sections 12 and 15 applied equally to the two face plates 18 so that the unit, with the closure plates 20 in position, will function as a waffle baker of full permitted heating capacity; and that with the plug 26 applied to the third and fourth terminals 24 and 25 the third and fourth heating elements 33 and 35 will be energized, the entire permitted heating capacity will be present in the lower section 15, and the unit by removal of the bottom closure plate 20 will function as a broiler of full permitted heating capacity.

Under these circumstances it will necessarily be obvious to those skilled in the art that I have provided a new and improved convertible heating unit particularly suitable for domestic uses energized from the usual domestic electrical outlet, and therefore that I have accomplished at least the principal object of my invention. At the same time it also will be understood by those skilled in the art that the particular embodiment of my invention herein shown and described possesses advantages other than those pointed out or suggested herein, and also that this particular embodiment of my invention may be variously changed and modified without departing from the spirit of my invention or sacrificing the advantages thereof, and it therefore will be understood that the disclosure herein is illustrative only, and that my invention is not limited thereto.

I claim:

1. In combination with an electric heating unit comprising a first section and a second section adapted to be placed in abutting relation, having their abutting faces formed of heat conducting material and spaced to form a cavity therebetween, as for baking waffles, and having a wall portion of one of said sections adapted to permit the emergence of heat therethrough, as for cooking, or broiling; comprising also a first heating element carried by the other of said sections in position to heat said abutting face of said other section; a second heating element carried by said one section in position to heat said abutting face of said one section or through said wall portion, and a third heating element carried by said one section in position to heat through said wall portion; connections for energizing only said first and second elements to heat said cavity, or only said second and third elements to heat doubly through said wall portion.

2. In combination with an electric heating unit comprising a first section and a second section adapted to be placed in abutting relation, having their abutting faces formed of heat conducting material and spaced to form a cavity therebetween, as for baking waffles, and having a wall portion of one of said sections removable to permit the emergence of heat therethrough, as for cooking, or broiling; comprising also a first heating element carried by the other of said sections in position to heat said abutting face of said other section, a second heating element carried by said one section in position to heat said abutting face of said one section or through said removable wall portion, and a third heating element carried by said one section in position to heat through said removable wall portion; connections for energizing said first and second elements to heat said cavity, or said second and third elements to head doubly through said removable wall portion.

3. In combination with an electric heating unit comprising a first section and a second section adapted to be placed in abutting relation, having their abutting faces formed of heat conducting material and spaced to form a cavity therebetween, as for baking waffles, and having in each of said sections a wall portion adapted to permit the emergence of heat therethrough, as for cooking, or broiling; comprising also a first heating element carried by said first section in position to heat through said wall portion of said first section, a second heating element carried by said first section in position to heat said abutting face of said first section or through said wall portion of said first section, a third heating element carried by said second section in position to heat said abutting face of said second section or through said wall portion of said second section, and a fourth heating element carried by said second section in position to heat through said wall portion of said second section; connections for energizing said first and second elements to heat doubly through said wall portion of said first section, or said second and third elements to heat said cavity, or said third and fourth elements to heat doubly through said wall portion of said second section.

4. In combination with an electric heating unit comprising a first section and a second section adapted to be placed in abutting relation, having their abutting faces formed of heat conducting material and spaced to form a cavity therebetween, as for baking waffles, and having a wall portion of one of said sections adapted to permit the emergence of heat therethrough, as for cooking, or broiling; comprising also a first heating element carried by the other of said sections in position to heat said abutting face of said other section, a second heating element carried by said one section in position to heat said abutting face of said one section or through said wall portion, and a third heating element carried by said one section in position to heat through said wall portion; connections connecting said elements in star; and connections for connecting power leads to the open end of said first element and the open end of said second element to energize said first and second elements to heat said cavity, or to the open end of said second element and the open end of said third element to energize said second and third elements to heat doubly through said wall portion.

5. In combination with an electric heating unit comprising a first section and a second section adapted to be placed in abutting relation, having their abutting faces formed of heat conducting material and spaced to form a cavity therebetween, as for baking waffles, and having in each of said sections a wall portion adapted to permit the emergence of heat therethrough, as for cooking, or broiling; comprising also a first heating element carried by said first section in position to heat through said wall portion of said first section, a second heating element carried by said first section in position to heat said abutting face of said first section or through said wall portion of said first section, a third heating element carried by said second section in position to heat said abutting face of said second section or through said wall portion of said second section, and a fourth heating element carried by said second section in position to heat through said wall portion of said second section; connections connecting said elements in star; and connections for connecting power leads to the open end of said first element and the open end of said second element to energize said first and second elements to heat doubly through said wall portion of said first section, or to the open end of said second element and the open end of said third element to energize said second and third elements to heat said cavity, or to the open end of said third element and the open end of said fourth element to energize said third and fourth elements to heat doubly through said wall portion of said second section.

6. In combination with an electric heating unit comprising a first section and a second section adapted to be placed in abutting relation, having their abutting faces formed of heat conducting material and spaced to form a cavity therebetween, as for baking waffles, and having a wall portion of one of said sections removable to permit the emergence of heat therethrough, as for cooking, or broiling; comprising also a first heating element carried by the other of said sections in position to heat said abutting face of said other section, a second heating element carried by said one section in position to heat said abutting face of said one section or through said removable wall portion, and a third heating element carried by said one section in position to heat through said removable wall portion; connections for energizing only said first and second elements to heat said cavity, or only said second and third elements to heat doubly through said removable wall portion.

7. In combination with an electric heating unit comprising a first section and a second section adapted to be placed in abutting relation, having their abutting faces formed of heat conducting material and spaced to form a cavity therebetween, as for baking waffles, and having in each of said sections a wall portion adapted to permit the emergence of heat therethrough, as for cooking, or broiling; comprising also a first heating element carried by said first section in position to heat through said wall portion of said first section, a second heating element carried by said first section in position to heat said abutting face of said first section or through said wall portion of said first section, a third heating element carried by said second section in position to heat said abutting face of said second section or through said wall portion of said second section, and a fourth heating element carried by said second section in position to heat through said wall portion of said second section; connections for energizing only said first and second elements to heat doubly through said wall portion of said first section, or only said second and third elements to heat said cavity, or only said third and fourth elements to heat doubly through said wall portion of said second section.

In testimony whereof I hereunto affix my signature.

FREDERICK M. HIBBEN.